Patented June 27, 1950

2,512,708

UNITED STATES PATENT OFFICE 2,512,708

RESORCINOL-ALDEHYDE TANNING PRODUCT

Harold C. Beachell, Lakewood, Ohio, assignor to E. I. du Pont de Nemours & Company, Wilmington, Del., a corporation of Delaware No Drawing. Application November 1, 1946, Serial No. 707,344

5 Claims. (Cl. 260—54)

This invention relates to tanning and is more particularly directed to tanning compositions and tanning processes which employ a resorcinol-ketaldone polymer in the presence of a boron-oxygen radical.

It has heretofore been proposed to use certain polymers of resorcinol with ketaldones, that is aldehydes or ketones, as tanning agents. Low molecular weight polymers have been far too astringent for satisfactory use as tanning agents so that the art has turned to higher molecular weight products. Such high molecular weight polymers are quite insoluble and it has been necessary to solubilize them by sulfonation. Unfortunately the sulfonated products are by no means as satisfactory in some respects as the unsulfonated lower molecular weight products. Thus because of the disadvantages attendant upon the use of either the low molecular weight or the higher molecular weight polymers, tanning agents prepared from resorcinol and ketones or aldehydes have not been well received as tanning agents.

It is an object of this invention to provide tanning compositions and tanning processes employing a resorcinol-ketaldone tanning agent and securing improved penetration of skins and decreased grain drawing. It is a further object to provide tanning processes and compositions which are simple and economical to use and which have high effectiveness. Still further objects will become apparent hereinafter.

The foregoing and other objects of this invention are attained by employing a boron-oxygen radical in conjunction with a resorcinol-ketaldone tanning agent.

The tanning agents employed according to the invention are relatively low molecular weight polymers of resorcinol with a ketaldone.

Any ketaldone of less than twelve carbon atoms may be used in the preparation of polymers for use according to the present invention. The term "ketaldone" has been used to designate both aldehydes and ketones as for instance in Patent 2,111,226. As examples of suitable specific materials, there may be mentioned such ketaldones as formaldehyde, acetaldehyde, furfural, acetone, aldol, mono or dichloro acetaldehyde, chloral, glyoxal, cyclohexanone, salicylaldehyde, and benzaldehyde. It is generally preferred to use acyclic ketaldones.

Particularly good results are obtained using formaldehyde in the preparation of resorcinol-ketaldone polymers for use as tanning agents according to the present invention.

As has been observed above, the polymers of the present invention should be of relatively low molecular weight or more properly should be water-soluble enough to be used as tanning agents. The term "water-soluble" is, standing alone, a little vague since many so-called insoluble materials are in fact soluble, at least to a certain extent. When the expression "water-soluble" is used herein it is intended to mean that the products are soluble in water to be usable as such in aqueous solutions and the solubility is, therefore, substantial. Generally it may be said that products can be designated water-soluble for the purpose of the present invention if, at 20° C., they are soluble to the extent of 10 grams per liter in water or slightly alkaline solutions of, say, pH 7.5.

The ratio of resorcinol to ketaldone may be widely varied. Though if there is too little resorcinol, the products will tend to be insufficiently soluble. Generally it can be observed that the ratio of resorcinol:ketaldone will fall within the range from about 0.25:1 to 5:1. With aldehydes because of their high reactivity, it will more specifically be preferred to use a resorcinol:aldehyde ratio of about 2:1 to 5:1. With ketones because of their relatively low activity, it will usually be preferred to use a ratio from about 0.25:1 to 1.7:1.

Preparation of resorcinol-ketaldone polymers can be effected in manners already generally well known to the art but it will ordinarily be found desirable to use a small amount of an acid as catalyst and it will usually be found desirable to heat the materials together under reflux for a period of time. If the polymerization conditions are too severe, there will ordinarily be obtained a product which is not water-soluble. Accordingly the conditions should be selected to produce a product which is water-soluble.

According to the present invention resorcinol-ketaldone tanning agents, as described above, are used with a compound which supplies a boron-oxygen radical.

Any compound may be used which can be dissolved in the tanning bath to yield in the solution boron-oxygen radicals. More specifically any boron-oxygen compound may be used which is soluble in water to the extent of 10 grams per liter at a pH of about 7 to 7.5. There may be employed, for instance, such soluble boron compounds as boric acid ($H_3BO_3$) and alkali borates such as borax ($Na_2B_4O_7 \cdot 10H_2O$), sodium borate ($Na_3BO_3$), sodium perborates ($NaBO_3 \cdot 3H_2O$ or $NaBO_3 \cdot 2H_2O$), sodium metaborates ($Na_2B_2O_4$ or $Na_2B_2O_4 \cdot 4H_2O$), and sodium tetraborates $$(Na_2B_4O_7 \text{ and } Na_2B_4O_7 \cdot 5H_2O)$$

While any of the soluble borate compounds (including pyroborates and perborates) which supply boron-oxygen groups may be used it is generally preferable to use the soluble alkali salts such as the sodium, potassium, or ammonium salt.

The boron-oxygen radical is believed to form a complex with the resorcinol-ketaldone polymer and the amount of a compound containing the boron-oxygen radical employed will depend in each instance upon the magnitude of effect desired. Generally the amount of a compound containing the boron-oxygen radical should be such that there is about 25 to 150 per cent by weight of the said compound based upon the weight of the polymer. More specifically it will ordinarily be preferred to use from about 50 to 100 per cent of a boron-oxygen-containing compound based upon the weight of the tanning agent used.

It will be understood that mixtures of compounds containing the boron-oxygen radical may be used. This will be found particularly desirable when the compounds selected have an effect upon the pH of the tanning solution. Thus by using a mixture of, say, borax and boric acid one may secure about the desired pH effect.

Compositions of the present invention may be prepared by incorporating in a solution of a resorcinol-ketaldone polymer in acetone or, preferably, in water the desired compound which contains the boron-oxygen radical. Alternatively, when a dry product is desired, the components to be used in making a tanning bath may all be mixed tog.ther in dry form. It may also be found desirable to prepare an aqueous solution containing the polymer and the desired amounts of compounds containing the boron-oxygen radical and drying the materials to produce a dry product. If such a system is precipitated by the use of acid by bringing it, say, to about pH 3 to 4, there may be separated a product which can be offered as such. When a formaldehyde-resorcinol polymer together with borax in water solution are brought to a pH of about 3 to 4, a friable product is obtained which is readily dissolved in water at the pH of tanning.

In compositions of the invention the compound containing a boron-oxygen radical will amount to about 25 to 150 per cent or, preferably, 50 to 100 per cent by weight of the resorcinol-ketaldone polymer present. It will, of course, be understood that suitable alkalis or acids may be included in such compositions for pH adjustment, though it will ordinarily be preferred to adjust pH by suitable additions to the tanning liquor. It will also be understood that other tanning agents, wetting agents, and various tanning assistants may be incorporated in compositions of the present invention.

In order that the invention may be better understood reference should be had to the following illustrative example.

*Example*

A resorcinol-formaldehyde polymer was first prepared.

Resorcinol was dissolved in water to form a 50 per cent solution. A 30 per cent solution of formaldehyde was added to the resorcinol solution in the ratio of two molecules of resorcinol to one of formaldehyde. Ten cc. of concentrated hydrochloric acid was added to the solution and heat was applied to reflux for a total of about 24 hours. The solution remained clear and of a dark red color. It was adjusted to 50 per cent solids.

A tanning solution was then made up with 10 pounds of the polymer solution prepared as above, dissolved in 25 pounds of water. To this was added 3 pounds of borax and 2 pounds of boric acid dissolved in 25 pounds of water. The pH of the tanning liquor was 6.8 and sodium hydroxide was added to raise this to pH 7.5. A bated hide in the amount of 50 pounds (equivalent drained, pickled weight) was placed in a tanning drum and the liquor added. Drumming was continued for about 16 hours. At the end of this time, the skin was thoroughly tanned and the leather was of excellent quality with good grain. A shrink temperature of 190° F. was obtained.

Similar results were obtained by using other ketaldones instead of formaldehyde and by using various ratios of ketaldone to resorcinol. Also excellent results were obtained using various other boron-oxygen compounds.

It is to be observed that the term "skin" is used generically to include heavy skins such as cowhide, lighter skins such as goatskin and calfskin, and also skins of fur-bearing animals. It will naturally be necessary to adapt the processes to the type of skin to be treated. Those skilled in the art are well aware of such factors and may readily adapt the tanning agents of this invention to the needs of the particular tanning problem.

Skins to be tanned according to the processes of this invention may be prepared in any of the manners customary in the art, particularly for the preparation of skins for vegetable tanning. They may be unhaired, limed, delimed, and bated. The skins, if pickled, should be de-pickled before tanning for, as will be mentioned hereinafter, it is preferred to effect tanning under substantially neutral conditions. The skins may be given a salt-liquor treatment to soften them up and to render them of a more uniform condition as is the practice in the art.

While skins prepared in any manner may be treated according to the processes of this invention, it will ordinarily be desired that the skins be at a pH near 7, or slightly on the acid side. The tanning operation is conducted at about pH 6.5 to 7.5 and while the tanning solution may suitably be controlled to compensate for variance of the pH of skins, it will often be found advantageous to bring the skins to a suitable pH prior to introducing them into the tanning solution. Generally, it may be indicated that the tanning operation with the agents of the invention is conducted beginning at a pH of 6.5 to 7.5. The tanning is then finished off at a slightly lower pH ending up with a pH from about 5 to 7.

The pH of tanning baths according to the present invention may be suitably adjusted by the use of conventional alkalies or acids and there may for instance be used such alkalies as alkali metal hydroxides or carbonates, and ammonium hydroxide. When it is desired to lower the pH of the tanning solution there may be used any acidic material such as lactic, hydrochloric, sulfuric, acetic, phosphoric, sulfamic, and formic acids.

Tanning processes, according to the present invention, are closely related to the vegetable tanning processes heretofore used and the close kinship between the processes makes it unnecessary to enter into great detail regarding tanning technique since those skilled in the art may use the tanning agents of the present invention in accordance with the practices already common in the art for vegetable tanning.

While the agents of the present invention may be used alone for tanning with excellent results, they may, if desired, be used together with any other tanning agent or tanning assistant known to the art. Again, in accordance with practices already well known, they may be used prior to or following other tannages. They may be used, for instance, in conjunction with vegetable tanning materials such as quebracho extract, with chrome tans, with synthetic tanning agents containing sulfonic acid groups, or with formaldehyde. They may also be used in conjunction with the tanning agents shown in the Graves Patents 2,205,882 and 2,205,883.

According to a preferred practice of the invention skins are first tanned with a resorcinol-ketaldone polymer, as described above, and then finished off with a quebracho retannage.

The hides following treatment with a tannage of the present invention may be further treated with a soluble salt of aluminum, iron, titanium, copper, or chromium as in the Kirk Patent 2,205,901.

Leather produced according to the processes of this invention may be subjected to any of the various kinds of finishing treatments customarily used. The leather, if desired, may be suitably filled or given any of the numerous surface treatments customary in the art. Various of the soluble lignum products, many of which are by-products of the paper-pulp industry, may also be used for the treatment of skins in conjunction with the processes above described. Such lignum products may, for instance, be introduced into the skins or leather and then precipitated in situ by a change of pH.

I claim:

1. A tanning composition comprising a water-soluble tanning polymer of resorcinol with an aldehyde of less than twelve carbon atoms, the resorcinol:aldehyde ratio being from 2:1 to 5:1 and the composition containing additionally from 25-150%, based upon the weight of polymer, of a water-soluble boron-oxygen compound selected from the group consisting of boric acid and an alkali borate and mixtures thereof.

2. A tanning composition comprising a water-soluble polymer of resorcinol with formaldehyde, the resorcinol:formaldehyde ratio being from 2:1 to 5:1, and the composition containing from 25 to 150 per cent, based upon the weight of polymer, of a water-soluble boron-oxygen compound selected from the group consisting of boric acid and an alkali borate and mixtures thereof.

3. A tanning composition comprising a water-soluble polymer of resorcinol with furfural, the resorcinol:furfural ratio being from 2:1 to 5:1 and the composition containing from 25-150%, based upon the weight of polymer, of a water-soluble boron-oxygen compound selected from the group consisting of boric acid and an alkali borate and mixtures thereof.

4. A tanning composition comprising a water-soluble polymer of resorcinol with glyoxal, the resorcinol:glyoxal ratio being from 2:1 to 5:1 and the composition containing from 25-150%, based upon the weight of polymer, of a water-soluble boron-oxygen compound selected from the group consisting of boric acid and an alkali borate and mixtures thereof.

5. A tanning composition comprising a water-soluble polymer of resorcinol with chloral, the resorcinol:chloral ratio being from 2:1 to 5:1 and the composition containing from 25-150%, based upon the weight of polymer, of a water-soluble boron-oxygen compound selected from the group consisting of boric acid and an alkali borate and mixtures thereof.

HAROLD C. BEACHELL.

REFERENCES CITED

The following references are of record in the file of this patent:

UNITED STATES PATENTS

| Number | Name | Date |
|---|---|---|
| 1,826,094 | Schuette | Oct. 6, 1931 |
| 1,910,464 | Doser | May 23, 1933 |

FOREIGN PATENTS

| Number | Country | Date |
|---|---|---|
| 344,033 | Germany | Nov. 12, 1921 |
| 388,680 | Germany | Jan. 19, 1924 |

OTHER REFERENCES

Wilson, "The Chemistry of Leather Manufacture," 2nd edition, volume II, 1928, published by the Chemical Catalog Co., Inc., N. Y. C., page 765.